United States Patent
Mulligan

(10) Patent No.: US 6,409,954 B1
(45) Date of Patent: Jun. 25, 2002

(54) METHOD OF MAKING A ROTARY MOLDED PLASTIC MEMBER WITH VARIABLE WALL THICKNESS

(75) Inventor: David C. Mulligan, Blissfield, MI (US)

(73) Assignee: Roto Plastics, Inc., Adrian, MI (US)

( * ) Notice: Subject to any disclaimer, the term of this patent is extended or adjusted under 35 U.S.C. 154(b) by 0 days.

(21) Appl. No.: 09/412,128

(22) Filed: Oct. 5, 1999

(51) Int. Cl.⁷ .......................... B29C 41/04; B29C 41/46
(52) U.S. Cl. ...................... 264/255; 264/310; 264/311
(58) Field of Search ............................... 264/301, 302, 264/303, 310, 311, 255

(56) References Cited

U.S. PATENT DOCUMENTS

| | | | | | |
|---|---|---|---|---|---|
| 3,759,480 A | * | 9/1973 | Stier et al. | .................. | 249/142 |
| 4,049,767 A | * | 9/1977 | Vaidya | ........................ | 264/257 |
| 4,104,357 A | * | 8/1978 | Blair | ............................. | 264/255 |
| 4,214,670 A | * | 7/1980 | Berger et al. | ................. | 220/70 |
| 4,292,015 A | * | 9/1981 | Hritz | ............................. | 425/73 |
| 4,606,868 A | * | 8/1986 | Christoph et al. | ......... | 264/40.4 |
| 4,611,851 A | * | 9/1986 | Noyes et al. | ................ | 297/199 |
| 4,621,995 A | * | 11/1986 | Wersosky | .................... | 425/144 |
| 4,623,503 A | * | 11/1986 | Anestis et al. | .............. | 264/302 |
| 4,664,864 A | * | 5/1987 | Wersosky | .................... | 264/301 |
| 4,790,510 A | * | 12/1988 | Takamatsu et al. | ......... | 249/117 |
| 5,374,180 A | * | 12/1994 | Bauer | ......................... | 425/429 |
| 5,538,158 A | * | 7/1996 | Prout | ......................... | 220/771 |
| 5,738,094 A | * | 4/1998 | Hoftman | ................ | 128/206.26 |
| 6,030,557 A | * | 2/2000 | Payne | ....................... | 264/40.5 |
| 6,126,881 A | * | 10/2000 | Eckert | ....................... | 264/245 |
| 6,214,272 B1 | * | 4/2001 | Gruenwald et al. | ........ | 264/255 |

* cited by examiner

Primary Examiner—Jan H. Silbaugh
Assistant Examiner—Stefan Staicovici
(74) Attorney, Agent, or Firm—Harness, Dickey & Pierce, P.L.C.

(57) ABSTRACT

A one-piece face mask with an integral inflatable cushion for use in providing an anesthetic to a patient. The mask has a dome shape outer wall terminating at its circumference in a thickened base on which the inflatable cushion is supported. The one-piece mask is formed by a combination of a rotational plastic molding process and gravity casting, which enables the different parts of the mask to be made of different thicknesses related to the function performed by the different parts in use of the mask.

3 Claims, 2 Drawing Sheets

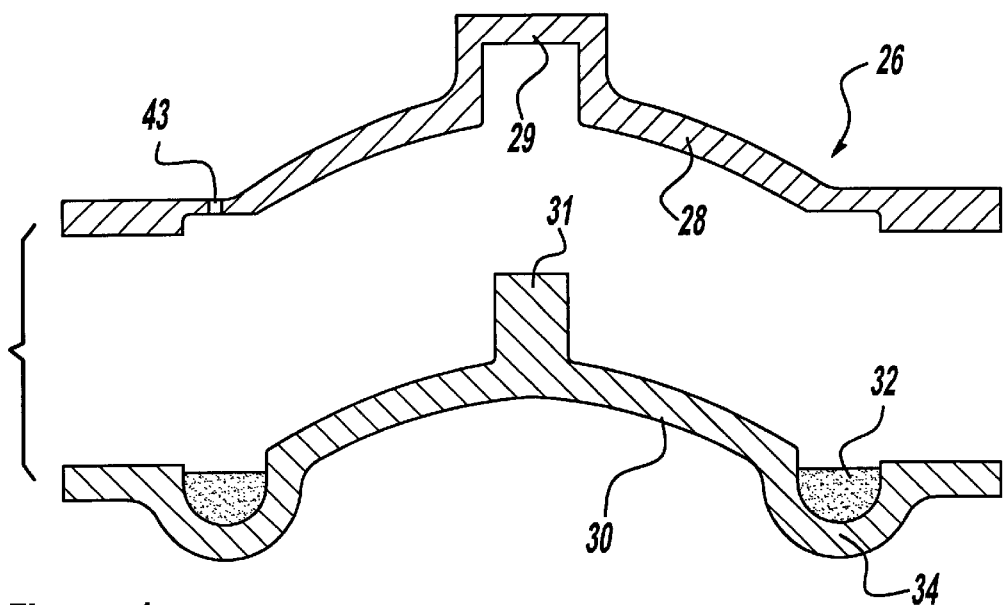
_Figure - 4_
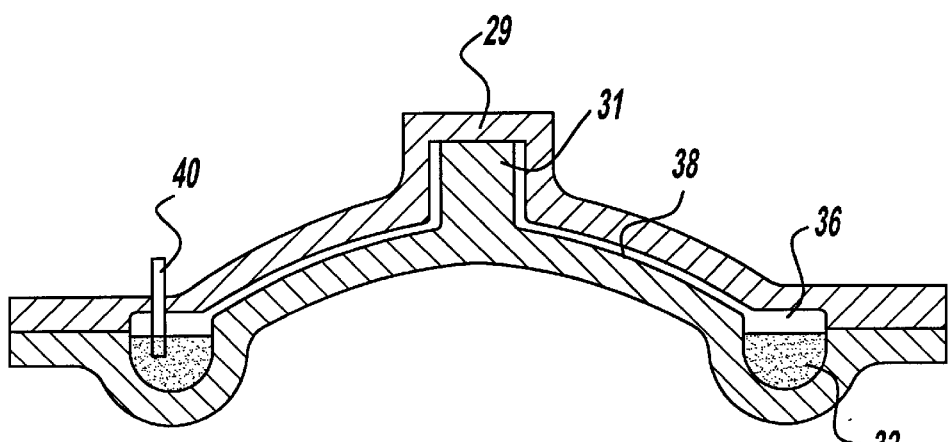
_Figure - 5_
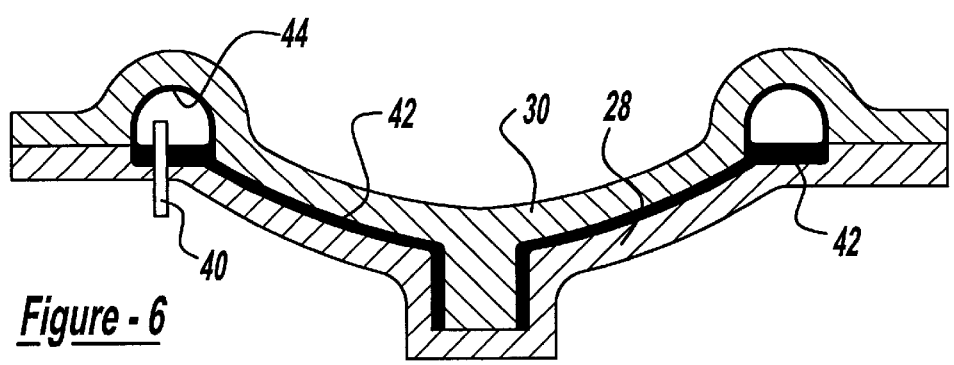
_Figure - 6_

METHOD OF MAKING A ROTARY MOLDED PLASTIC MEMBER WITH VARIABLE WALL THICKNESS

TECHNICAL FIELD OF THE INVENTION

This invention relates generally to the art of rotational molding. More specifically, this invention relates to a method of rotational molding a one-piece thin walled hollow article in combination with a gravity cast member, which has both its inner and outer surfaces defined by mold surfaces.

BACKGROUND

Rotational molding apparatus and processes for producing thin walled hollow articles are well known in the art. Even molding using the "stop rotation" process produces a thicker support base. These support bases, however, predominantly have only one surface defined by the mold wall. The typical rotational molding process starts with placing a predetermined amount of polymeric resin in an open mold. The mold is closed, placed in an oven and continually rotated about two axes. The plastic melts and flows over the heated inside surface of the mold, forming a generally even wall thickness. After sufficient processing time, the mold is removed from the oven and cooled while still being continuously rotated. The mold is then opened and the part removed. Typically a uniform wall thickness is desired for a rotationally molded part. It is critical in rotationally molding a part that the plastic have the necessary mold coating and flow characteristics to assure a uniform wall thickness. For this reason, great attention is paid to the formulation of special compositions of molding powders and liquids to provide high flow and uniform coating of the mold surfaces. Additional process parameters, such as the heat transfer through a selected portion of the mold and the rotational speed ratio between the two axes are varied to achieve a uniform wall thickness. Nevertheless, it can be difficult to assure uniform coating of a thin walled part because effects of surface adhesion prevent even bulk fluid flow given the small volume of plastic attempting to spread over a large surface.

Within limits, some variation of wall thickness can be achieved when desired. Taking advantage of the characteristic that the portion of the mold which reaches curing temperature first will accumulate the thickest layer of plastic, selective variation of heat transfer can induce thicker or thinner walls in a given portion of the part. This is achieved by adjusting the mold thickness or material to vary heat conductivity in select regions of the mold and by varying the heat input to the mold by preheating or shielding.

Another method of achieving variation of wall thickness is by adjusting the rotation method. As mentioned above, changing the ratio of turns about one axis relative to another can adjust the wall thickness, within limits based on the part and rotation axis geometry. One variation of this technique is found in U.S. Pat. No. 4,292,015, which describes an apparatus for rotational molding generally known as a rock and roll machine. These machines are well suited for moldings with very long length to diameter ratios such as canoes and kayaks. The mold, mounted on a cradle, is rocked back and forth on a stationary, transverse horizontal axis while it is rotated about a longitudinal moving axis perpendicular to the horizontal axis. In this type of machine the mold is not rotated end for end. The '015 patent teaches variation of the wall thickness due to the ability to vary the speed of the tilting action about the horizontal axis during the tilting. By increasing the dwell, for example at the horizontal position, more plastic will accumulate at the central portion of the article. Rotation is continued about the longitudinal axis and the wall thickness is substantially even about the sections along the longitudinal axis.

An additional variation of the rotational molding process is referred to as "stop-rotation". This process utilizes a liquid polymeric compound, which reacts to heat in a somewhat similar manner as that described above. The mold rotation, however, is stopped on at least one axis during the heating process prior to fusion of the material occurring. This stopping of the mold rotation while the compound is still liquid, allows most of the liquid polymer to drain off of the upper mold surfaces and accumulate in the lower regions of the mold. The inner surface of this accumulated material is self-leveling, as it is still in a liquid state, and has no mold surface in contact with it.

It is apparent that none of the methods described above are suited to the desire of making the one-piece article of this invention.

SUMMARY OF THE INVENTION

Accordingly, this invention provides a rotational mold structure which can be developed according to this invention so that a desired inflatable toroidal shaped section, with a support base and an integral cover or dome is produced, molded all in one piece. This article overcomes the problems and disadvantages of the conventional techniques in the art, which required multiple pieces separately made and later put together.

Briefly, the invention includes a one-piece face mask with a dome shape outer wall terminating at its circumference in a thickened base and an inflatable cushion of toroidal shape extending in a direction away from said dome and said base, the cushion being integral with said base and having a hollow chamber.

BRIEF DESCRIPTION OF THE DRAWINGS

Further features and advantages of the invention will become apparent from the following discussion and the accompanying drawings, in which:

FIG. 4 is a cross-sectional view of an open mold for use in molding the hollow article shown in FIG. 1, with particalized plastic in the bottom half of the mold;

FIG. 5 is a view of the mold shown in FIG. 4 in a closed condition but before heating of the plastic in the bottom half of the mold; and FIG. 6 shows the closed mold of FIG. 5 in an inverted position in which the article shown in FIG. 1 has been formed and can now be removed from the mold shown in FIG. 4.

DETAILED DESCRIPTION OF THE PREFERRED EMBODIMENT

The following description of the preferred embodiment is merely exemplary in nature, and is in no way intended to limit the invention or its application or uses.

Figure 1:
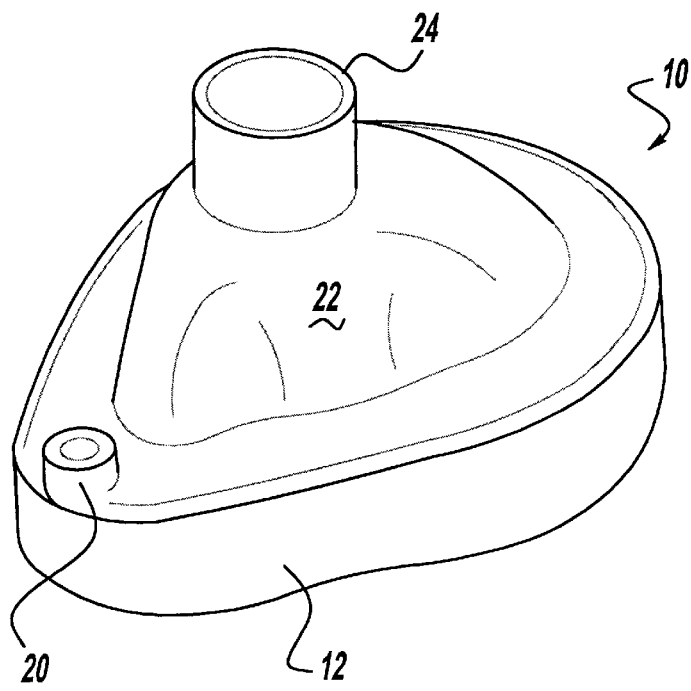
FIG. 1 is a perspective view of the hollow article of this invention, namely, a mask for a patient inhaling aesthetic gas, oxygen or air.
Figure 2:
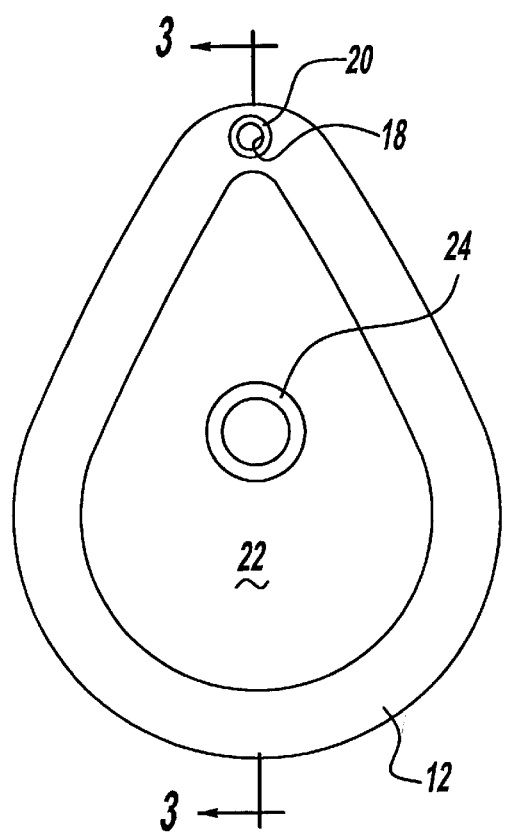
FIG. 2 is a top view of the hollow article shown in FIG. 1.
Figure 3:
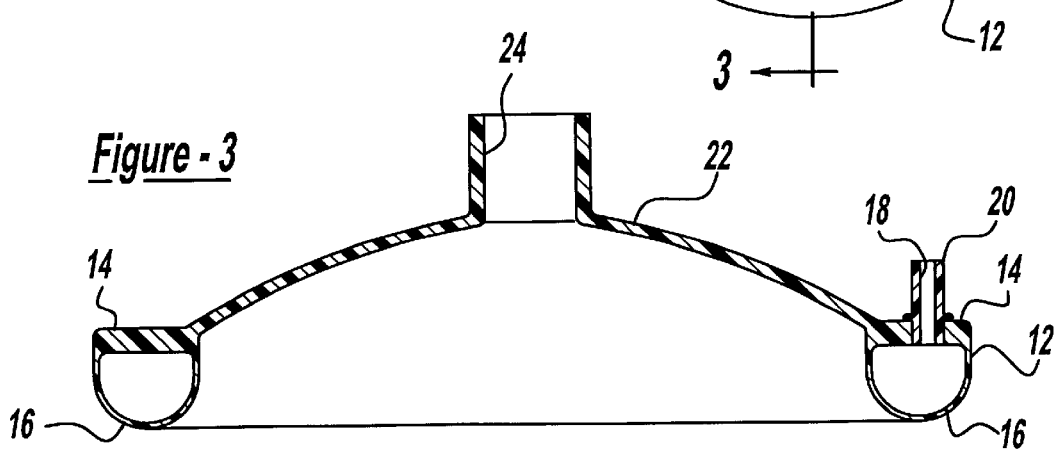
FIG. 3 is a cross-sectional view of the hollow article of this invention as seen from the lines 3—3 in FIG. 2.

With respect to the drawing, the one-piece plastic mask of this invention is indicated generally at 10. The mask 10 includes a cushion 12 which, when viewed from above, is of the generally toroidal shape shown in FIG. 2. As shown in FIG. 3, the top wall 14 of the cushion 12 is very thick with respect to the bottom wall 16 which is very thin. The top wall 14 has a hole 18 in which a tube or valve 20 is. inserted for the purpose of inflating the cushion 12 or allowing the cushion 12 to deflate. A dome 22, integral with the cushion 12, extends upwardly. The dome 22 has a central passage 24 to direct anesthetic gas, oxygen, or air into and out of the dome 22 when the mask is used for applying anesthetic gas, oxygen, or air.

It is to be emphasized that the mask 10 is of one-piece molded plastic. The bottom wall 16 on the cushion 12 is very thin. In contrast, the top wall 14 is very thick so as to function as a base for the cushion 12. Finally, the cover or dome 22 is of medium thickness between the very thin wall 16 in the cushion 12 and the top wall or heavy base 14, which carries the cushion 12 and supports the dome 22.

Turning now to FIGS. 4, 5, and 6, a mold 26 is shown in FIG.4 in an open position. When the mold 26 is open, the top part 28 of the mold is spaced above the bottom part 30 of the mold 26. An angular trough 34 in the bottom mold part 30 is filled with a measured particularized polymeric resin 32.

In FIG. 5, it is seen that when the upper part 28 of the mold 26 is lowered onto the lower part 30, a plate 29 on the mold top part 28 rests on a stop 31 on the lower mold 30 to create an annular space 36 corresponding to the base 14 in the mask 10 and a dome shape space 38 located radially inward from the space 36 and corresponding to the shape of the cover or dome 22. A pin 40 is extended through an opening 43 in the top part 28 of the mold 26 so that when the mask 10 is formed, the opening 18 shown in FIG. 3 will be provided for supporting the tube or valve 20 (FIG. 3).

In the process of this invention, the closed mold 26 (FIG. 5) carrying the polymeric resin 32 is placed in an oven and continually rotated about a plurality of axes. The plastic 32 melts and flows over the inside surface of the mold 26 forming the mask 10. After a sufficient processing time, rotation is stopped, at least on one axis during the heating process prior to fusion of the plastic. The mold 26 is inverted as shown in FIG. 6 so that the flowable plastic indicated at 42 will flow into the space 36, which is now below the trough 34. The plastic in the space 36 is self-leveling and has no mold surface on its topside. The liquid plastic also flows from the space 36 into the passage 38. The passage 38 now is a cavity by virtue of its position below the space 36. Thus the cover 22 is gravity cast in the passage 38 to create the dome 22 which is integral with the annular base 14. The molten resin that clings to the inside surface of the trough 34 and is shown at 44 in FIG. 6 is very thin.

After sufficient processing time in the oven, the mold is removed from the oven and cooled while still being continuously rotated. The mold is then opened and the part removed. As shown in FIG. 6, the mask 10 that is removed from the mold 26 will have three different thicknesses in different parts of the mask 10.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method of rotational molding a one-piece article in a rotational molding structure, said method comprising:

rotational molding an annular hollow cushion in said molding structure and then;

gravity casting in said molding structure a base member integral with said cushion and a cover member of circular shape radially inward from said cushion and said base member and integral with said base member and said cushion.

2. A method for making a rotary molded plastic member with variable wall thickness, said, method comprising:

providing a rotational molding structure operable to form said rotary molded plastic member, having top and bottom sections moveable toward and away from each other to achieve open and closed conditions of said structure, said mold sections having connecting cavities for a thick base, a toroidal chamber, and a top member;

supplying a polymeric resin into a trough located in the bottom section of said mold structure in the open condition of the mold;

closing the mold;

heating the mold to melt the resin and simultaneously rotating said mold so that the resin will flow from the trough into the mold cavities; and turning the mold to a position in which some of the molten resin will flow from the bottom section to the top section leaving only a thin layer of resin on said bottom mold section to form said toroidal chamber, said base member, and said top member thereby enabling forming a structure having a thick base member, a thinner top member, and a still thinner chamber wall.

3. A method for making a one-piece generally toroidal hollow chamber that is expandable and is integral with a base member which is in turn integral with a dome, said method comprising:

providing a rotational molding structure operable to form said toroidal hollow chamber, having top and bottom sections moveable toward and away from each other to achieve open and closed conditions of said structure, said bottom section having an annular trough;

supplying a polymeric resin in said bottom section trough in the open condition of the mold;

closing the mold to provide a first cavity which communicates with said trough and extends upwardly from said trough, and a second cavity communicating with said first cavity and extending upward from said first cavity;

heating the mold to melt the resin and simultaneously rotating said mold; and turning the mold upside down so that the molten resin will flow downwardly from said trough to self level said first cavity so as to form a hollow chamber in said trough that is integral with said base and has a wall thickness smaller than said base and also fill said second cavity to form said dome.

\* \* \* \* \*

UNITED STATES PATENT AND TRADEMARK OFFICE
CERTIFICATE OF CORRECTION

PATENT NO. : 6,409,954 B1
DATED : June 25, 2002
INVENTOR(S) : David C. Mulligan

It is certified that error appears in the above-identified patent and that said Letters Patent is hereby corrected as shown below:

Column 3,
Line 7, after "cushion 12 is" remove ".".
Line 24, "annular" should be -- angular --.

Signed and Sealed this

Thirtieth Day of September, 2003

JAMES E. ROGAN
*Director of the United States Patent and Trademark Office*